(12) United States Patent
Zhang

(10) Patent No.: US 10,956,548 B2
(45) Date of Patent: Mar. 23, 2021

(54) USER AUTHENTICATION VIA EMOTION DETECTION

(71) Applicant: Lenovo (Singapore) Pte. Ltd., Singapore (SG)

(72) Inventor: Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 168 days.

(21) Appl. No.: 16/155,463

(22) Filed: Oct. 9, 2018

(65) Prior Publication Data
US 2020/0110863 A1    Apr. 9, 2020

(51) Int. Cl.
| | |
|---|---|
| G06F 21/32 | (2013.01) |
| G06F 9/54 | (2006.01) |
| G06K 9/00 | (2006.01) |
| H04L 29/06 | (2006.01) |
| H04N 21/442 | (2011.01) |
| H04N 21/234 | (2011.01) |
| H04N 21/258 | (2011.01) |

(52) U.S. Cl.
CPC .............. G06F 21/32 (2013.01); G06F 9/542 (2013.01); G06K 9/00288 (2013.01); G06K 9/00302 (2013.01); H04L 63/0861 (2013.01); H04N 21/23418 (2013.01); H04N 21/25875 (2013.01); H04N 21/44218 (2013.01)

(58) Field of Classification Search
CPC .. G06F 21/32; G06F 9/542; G06F 2221/2103; G06K 9/00288; G06K 9/00302; H04L 63/0861; H04N 21/44218; H04N 21/23418; H04N 21/25875
See application file for complete search history.

(56) References Cited

U.S. PATENT DOCUMENTS

| | | | | |
|---|---|---|---|---|
| 8,410,903 | B2 * | 4/2013 | Hirai ................... | G06K 9/00268 340/5.83 |
| 8,812,367 | B2 * | 8/2014 | Aziz ................ | G06Q 20/40145 705/16 |
| 9,459,731 | B2 * | 10/2016 | Ricks ...................... | G06F 3/041 |
| 9,681,166 | B2 * | 6/2017 | Naveh ................ | G06F 16/5866 |
| 9,792,602 | B2 * | 10/2017 | Eun .......................... | G06F 3/016 |
| 10,044,712 | B2 * | 8/2018 | Gordon ............. | H04W 12/0609 |
| 10,346,605 | B2 * | 7/2019 | Narasimhan ............ | G06F 21/32 |
| 10,380,414 | B2 * | 8/2019 | Yao ..................... | G06K 9/00281 |
| 10,445,482 | B2 * | 10/2019 | Ren ..................... | G06K 9/00288 |
| 10,594,690 | B2 * | 3/2020 | Scopis ................... | H04L 63/105 |

(Continued)

Primary Examiner — Oleg Korsak
Assistant Examiner — Feliciano S Mejia
(74) Attorney, Agent, or Firm — Ference & Associates LLC

(57) ABSTRACT

One embodiment provides a method, including: detecting, from a user and using a sensor operatively coupled to an information handling device, for facial features associated with an authorized user; requesting, using a prompt provided by an output device operatively coupled to an information handling device, the user to mimic at least one emotion; detecting, responsive to the requesting, at least one facial expression provided by the user; and authenticating the user responsive to determining that: the at least one facial expression corresponds to at least one accepted facial expression associated with the at least one emotion and the at least one facial expression comprises the facial features. Other aspects are described and claimed.

18 Claims, 3 Drawing Sheets

(56) References Cited

U.S. PATENT DOCUMENTS

| | | | |
|---|---|---|---|
| 10,601,821 B2* | 3/2020 | Du | G06K 9/00241 |
| 2013/0015946 A1* | 1/2013 | Lau | G06F 21/32 |
| | | | 340/5.2 |
| 2015/0379332 A1* | 12/2015 | Matsunaga | G06K 9/00268 |
| | | | 348/77 |
| 2017/0346817 A1* | 11/2017 | Gordon | G02B 27/0172 |
| 2018/0196930 A1* | 7/2018 | Ahuja | G06F 21/32 |
| 2020/0065569 A1* | 2/2020 | Nduka | G06K 9/2036 |

* cited by examiner

USER AUTHENTICATION VIA EMOTION DETECTION

BACKGROUND

Information handling devices ("devices"), for example smart phones, tablet devices, smart speakers, laptop and personal computers, and the like, may have measures in place to authenticate a user prior to granting that user access to content on the device (e.g., access to a user profile, access to an application, etc.). For example, authentication mechanisms may include password authentication (e.g., provided via keyboard input, touch input, audible input, etc.), fingerprint identification, voice authentication, face authentication, and the like. Responsive to authenticating a user, a device may thereafter grant the user access to the requested content.

BRIEF SUMMARY

In summary, one aspect provides a method, comprising: detecting, from a user and using a sensor operatively coupled to an information handling device, for facial features associated with an authorized user; requesting, using a prompt provided by an output device operatively coupled to an information handling device, the user to mimic at least one emotion; detecting, responsive to the requesting, at least one facial expression provided by the user; and authenticating the user responsive to determining that: the at least one facial expression corresponds to at least one accepted facial expression associated with the at least one emotion and the at least one facial expression comprises the facial features.

Another aspect provides an information handling device, comprising: a sensor; an output device; a processor; a memory device that stores instructions executable by the processor to: detect for facial features associated with an authorized user; request, using a prompt, a user to mimic at least one emotion; detect, responsive to the requesting, at least one facial expression provided by the user; and authenticate the user responsive to determining that: the at least one facial expression corresponds to at least one accepted facial expression associated with the at least one emotion and the at least one facial expression comprises the facial features.

A further aspect provides a product, comprising: a storage device that stores code, the code being executable by a processor and comprising: code that detects for facial features associated with an authorized user; code that request a user to mimic at least one emotion; code that detects at least one facial expression provided by the user; and code that authenticates the user responsive to determining that: the at least one facial expression corresponds to at least one accepted facial expression associated with the at least one emotion and the at least one facial expression comprises the facial features.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
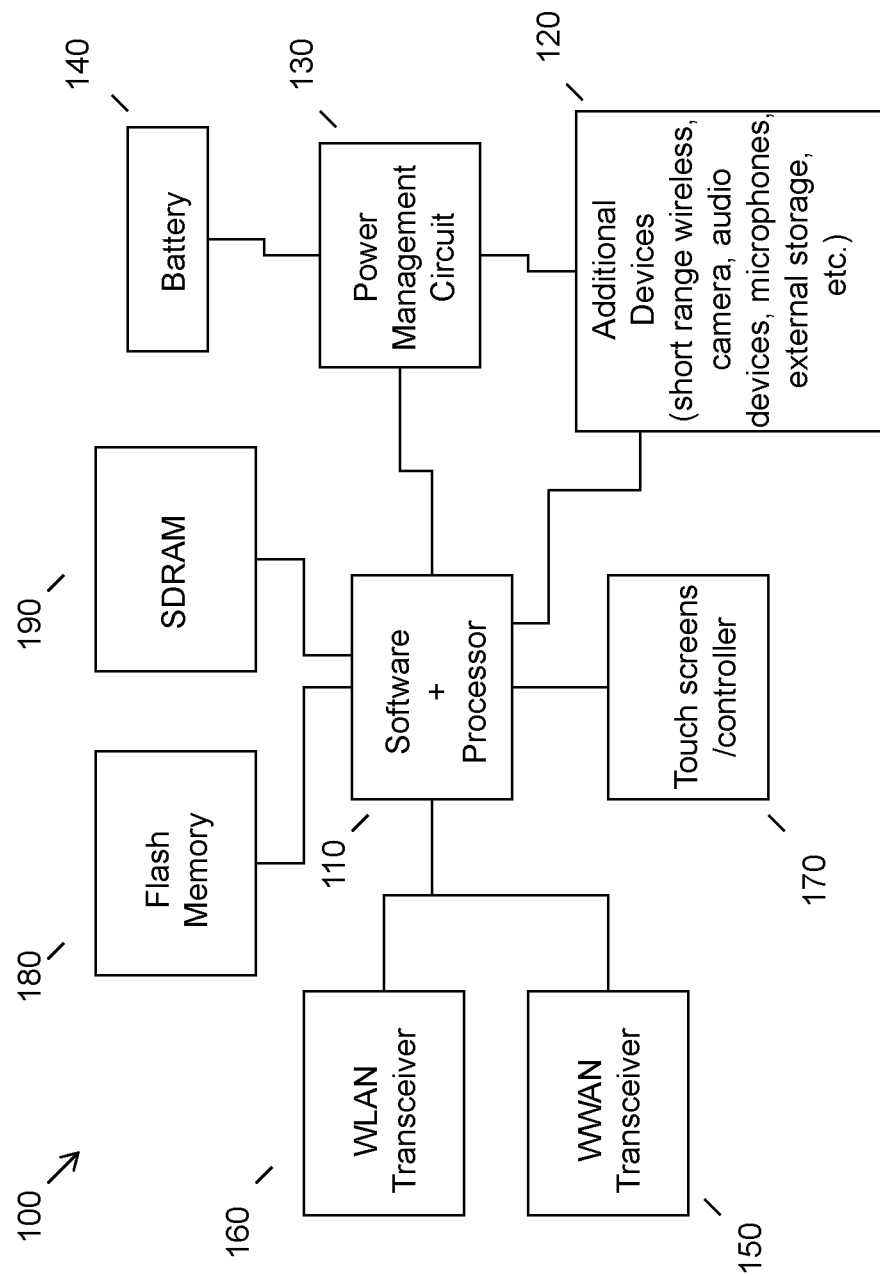
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As facial recognition technologies advance, face recognition is becoming an important method for user authentication in addition to password input, fingerprint input, iris input, and the like. Although these technologies are becoming more mature and robust, conventional methods for performing face authentication tend to be easily spoofed. For example, a bad actor may place a printed photo of an authorized user in front of a camera of the device in an attempt to trick the device to unlock or to grant them access to a particular application. Bad actors may also use prerecorded videos of an authorized user and/or 3D masks of the authorized user to attempt to spoof the system.

Although methods exist to combat spoofing, each of these conventional methods comprises certain issues. For example, conventional technologies may be able to analyze the features of an image to see if the image is a printed copy or human skin. However, this method does not work well on high resolution images. As another example, blink detection may also be utilized; however, this method may be faked by software to replace the eye ball of an image with blinking eyes. As another example still, 3D depth information may be leveraged to attempt to differentiate between a 2D image and a real-life individual. However, capturing 3D depth information may require an expensive camera. Additionally, such a method may still not be able to prevent a spoofing attempt if a well-made 3D mask is utilized.

Accordingly, an embodiment provides a method for authenticating a user via emotion detection. In an embodiment, facial features associated with a user may be detected by a sensor operatively coupled to a device. Before, after, or substantially simultaneously during the detection, an embodiment may provide the user with a prompt requesting the user to mimic at least one emotion. The prompt may be an audible prompt, a visual prompt (e.g., composed of writing, images, etc.), a combination thereof, and the like. An embodiment may then detect a facial expression provided by the user and determine whether the facial expression corresponds to the emotion and whether the facial expression comprises facial features known to be associated with an authorized user. Responsive to arriving at a positive determination, an embodiment may authenticate a user and grant the user access to requested content. Such a method of user authentication may provide greater security to a device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
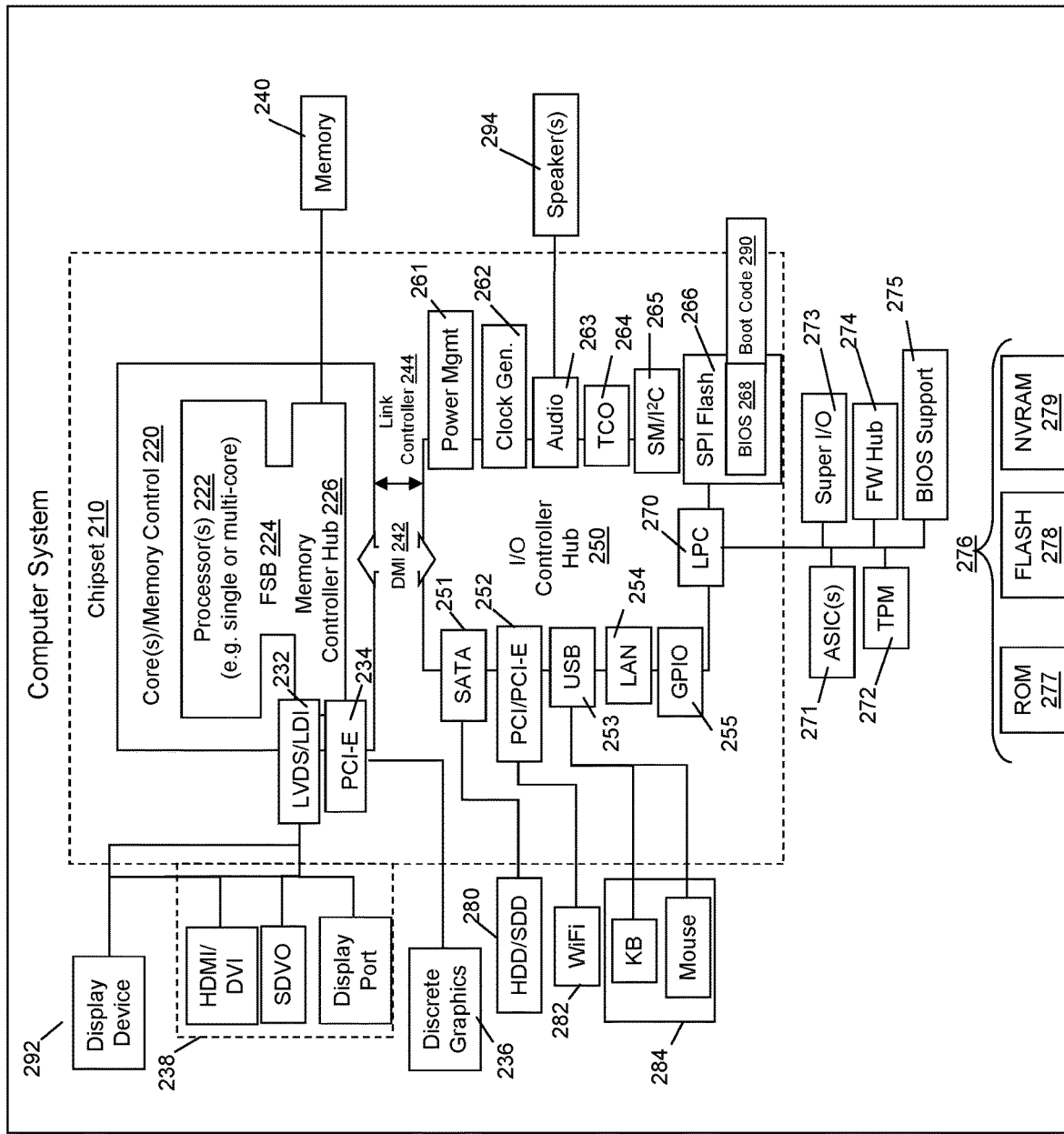
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAIVI 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of acquiring and processing facial feature data. For example, the circuitry outlined in FIG. 1 may be implemented in a tablet or smart phone embodiment, whereas the circuitry outlined in FIG. 2 may be implemented in a laptop embodiment.

Figure 3:
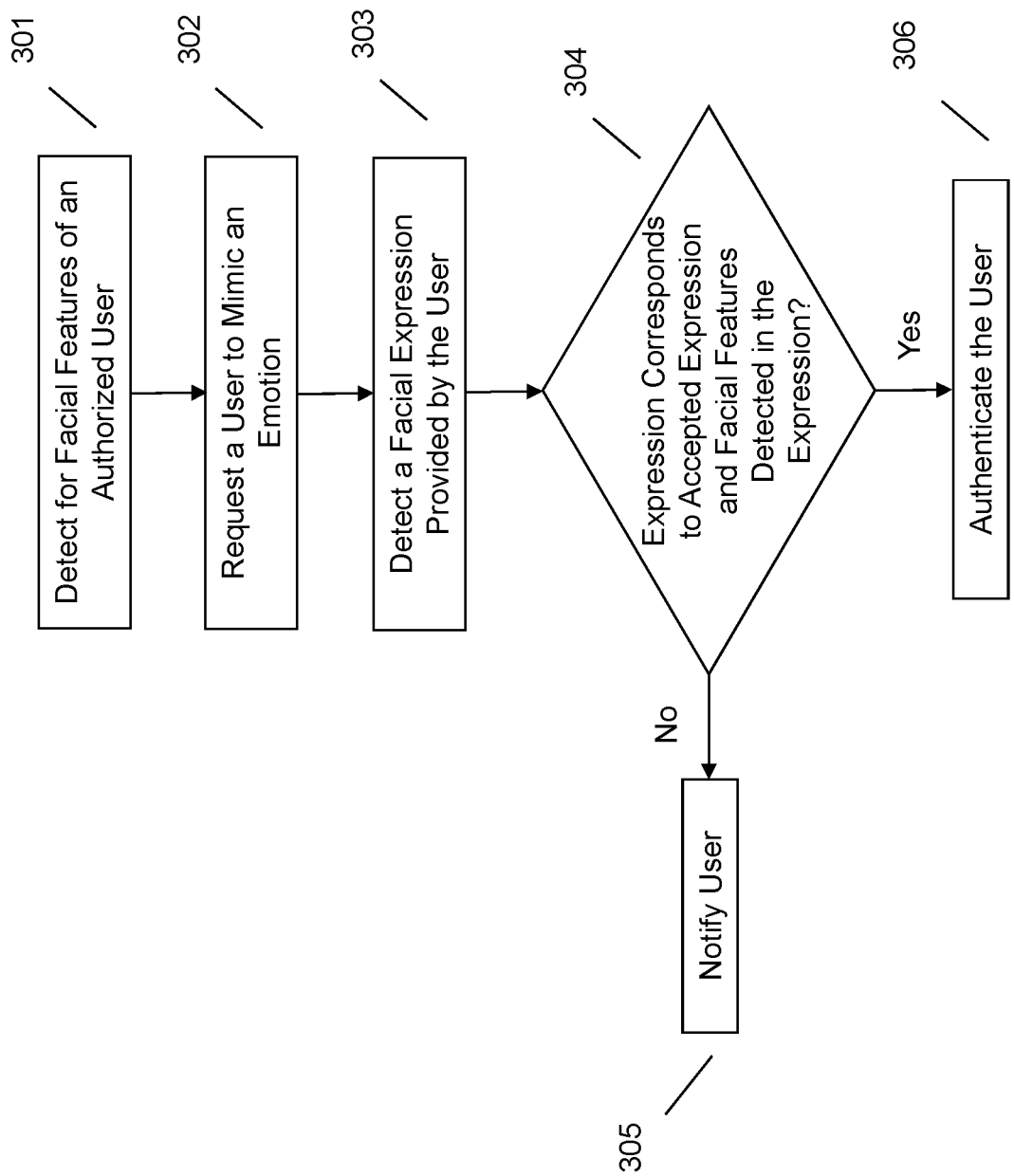
FIG. 3 illustrates an example method of authenticating a user using emotion detection.

Referring now to FIG. 3, an embodiment may authenticate a user via emotion detection. At 301, an embodiment may detect for facial features associated with an authorized user. In the context of this application, facial features may refer to virtually any facial features on a user's face (e.g., eyes, nose, mouth, a combination thereof, etc.). Furthermore, an authorized user may refer to a user who is allowed to access particular content on a device and whose facial features have been previously identified and stored. In an embodiment, a user may present their face for detection and analysis to determine whether their facial features correspond to the facial features of an authorized user. An embodiment may provide an explicit notification to the user that their facial features are being analyzed or may perform the detection more subtly, without a notification. In an embodiment, the detection may be conducted using one or more sensors (e.g., cameras, other image capture devices, a combination thereof, etc.) integrally or operatively coupled to the device. For example, a camera of a device may capture one or more images of a user's face that may thereafter be analyzed (e.g., using conventional image analysis techniques, etc.) to identify whether the detected facial features of the user correspond to those of an authorized user.

At 302, an embodiment may request a user to mimic one or more emotions provided to the user via a prompt. In the context of this application an emotion may refer to virtually any conventional emotion (e.g., anger, sadness, joy, disgust, surprise, confusion, etc.). In an embodiment, the prompt may be provided to the user using one or more of a variety of different output methods (e.g., visual output, audible output, a combination thereof, etc.) and output devices (e.g., display screens, speakers, etc.), which will be elaborated upon more below.

In an embodiment, the prompt may request a user to mimic a single emotion. For example, an embodiment may display a block of text specifying which emotion to mimic. As another example, an embodiment may display a stylized character image (e.g., a cartoon, an emoji, etc.) and ask the user to mimic the emotion expressed by the character in the image. As another example still, an embodiment may audibly request a user to mimic an emotion. This request may be accomplished by simply vocally asking the user to mimic the emotion or may be a request that is more complex. For instance, an embodiment may play an audio clip (e.g., a pre-recorded audio clip stored on the device, an audio clip accessed from the Internet, etc.) in which an emotion is expressed by one or more individuals (e.g., by an individual speaking, singing, etc.). The expression of the emotion in this embodiment may be an emotion of the individual or individuals in the audio clip.

In an embodiment, the prompt may request a user to mimic a plurality of emotions. More particularly, an embodiment may request a user to mimic an emotion sequence. In the context of this application, an emotion sequence may be a sequence comprising at least two emotions. The emotion sequence may be presented using visual output methods, audible output methods, a combination thereof, and the like. An embodiment may require a user to correctly mimic each emotion in the sequence prior to authenticating the user. Alternatively, an embodiment may require a user to correctly mimic a predetermined number of emotions in the sequence (e.g., three, five, etc.) prior to authenticating the user.

In an embodiment, the prompt may be randomly generated or may be preconfigured by a user. In an embodiment, a randomly generated prompt may correspond to an embodiment that randomly chooses whether to request a user to mimic one emotion or two or more emotions. In another embodiment, a randomly generated prompt may correspond to an embodiment that randomly chooses which emotion to request a user to mimic. In another embodiment, a randomly generated prompt may correspond to an embodiment that randomly chooses the method by which to output the prompt (e.g., visual output, audible output, etc.).

Alternative to the foregoing, a preconfigured prompt may be a prompt that may be created or designated by a user. For example, a user may designate an emotion, or emotion sequence, which is presented by the prompt each time the prompt is provided. In another embodiment, a preconfigured prompt may correspond to a specific emotion, or emotion sequence, which a user has designated to be presented each time the prompt is provided. In another embodiment, a preconfigured prompt may correspond to the method by which to output the prompt.

At 303, an embodiment may detect a facial expression provided by the user. To mimic an emotion, a user must provide a facial expression that is associated with an accepted facial expression for the emotion. In an embodiment, the facial expression may be one or more of a conventional facial expression or a user-created facial expression. For example, to mimic the emotion of surprise, a conventional facial expression provided by the user may include wide eyes, raised eyebrows, an open mouth, etc. As another example, to mimic the emotion of joy, a conventional facial expression provided by the user may include an open-mouth grin. In an embodiment, the accepted facial expressions may be stored in an accessible database (e.g., stored locally on the device or remotely on another device or network, etc.).

With respect to user-created facial expressions, an embodiment may allow users to associate a unique facial expression with a particular emotion. For example, a user may wish to create a unique facial expression that corresponds to the emotion of confusion. In a device training period, a user may contort their face in any way they desire and designate that input as being associated with the emotion of confusion. This facial input may thereafter be stored in an accessible database and accessed when an embodiment prompts a user to mimic the emotion of confusion.

In an embodiment, the detection, at 301, may be conducted before, during, or after steps 302 or 303. For example, an embodiment may detect a user's facial features prior to receiving any facial expression input from a user (e.g., when the user picks up the device, etc.). In another example, an embodiment may analyze the facial expression to determine if the provided facial expression has facial features associated with an authorized user. Alternatively, in another embodiment, a user's facial features may be detected at multiple points in the method. For instance, an embodiment may first detect a user's facial features, at 301, when they begin interacting with the device and then again, at 303, when the user is providing the facial expression. In an embodiment, the method may be a two-tiered process in which an embodiment does not move to steps 302 and 303 if step 301 is not passed. For example, if an embodiment determines that a user's facial features do not correspond to the facial features of an authorized user then an embodiment may not even provide the user with a prompt nor detect for a facial expression provided by the user.

At 304, an embodiment may determine whether the at least one facial expression corresponds to the at least one emotion and also whether the at least one facial expression comprises facial features associated with an authorized user. Responsive to determining, at 304, that at least one of the foregoing factors does not create a positive determination, an embodiment may, at 305, notify a user that the authentication process has failed and prevent the user from gaining access to requested content. Conversely, responsive to determining, at 305, that both of the foregoing factors create a positive determination, an embodiment may, at 306, authenticate a user and grant the authenticated user access to requested content.

In an embodiment, responsive to determining that the facial features in the provided facial expression match those features of an authorized user but that the facial expression does not correlate with an accepted facial expression to the prompted emotion, an embodiment may request the user to provide the facial expression again. For example, if an embodiment determines that the facial expression does not correlate with an accepted facial expression but does share a predetermined level of similarity (e.g., 50% similarity, 75% similarity, etc.) with an accepted facial expression, then an embodiment may request the user to provide the facial expression again or may provide the user with guidance on how to complete the expression (e.g., an embodiment may advise the user to smile more or to contort their face in a specific way to better match the accepted expression, etc.). In another embodiment, a system may prompt the user to provide another facial expression if they are unable to correctly provide the initially requested facial expression. In an embodiment, if a user is unable to provide the correct facial expression after a predetermined number of prompts (e.g., three, etc.) an embodiment may deny the user access to the requested content.

In an embodiment, an embodiment may determine whether a user's request to access content corresponds to a high security risk request or a low security risk request. In the context of this application, a high security risk request may correspond to any request to access sensitive information (e.g., information explicitly designated as sensitive, information protected by a password, etc.), any request to effect a financial matter (e.g., a request to withdraw or transfer money, a request to purchase something, etc.), any request to adjust a major user setting, and the like. In the context of this application, a low security request may correspond to any request to use a common application (e.g., a weather application, a camera application, a calculator application, a navigation application, etc.). Responsive to determining that the request corresponds to a high security risk request, an embodiment may increase the difficulty of the prompt (e.g., requesting the user to mimic more emotions, etc.). Responsive to determining that the request corresponds to a low security risk request, an embodiment may forego the emotion-based prompt completely and simply execute the risk.

The various embodiments described herein thus represent a technical improvement to conventional user authentication techniques. Using the techniques described herein, an embodiment may detect facial features associated with a user and request a user to mimic one or more emotions expressed in a prompt. An embodiment may then detect a facial expression provided by the user in response to the prompt and thereafter determine whether the facial expression provided by the user corresponds to an accepted facial expression associated with the emotion and whether the facial express comprises the facial features of an authorized user. Responsive to arriving at a positive determination for both of the foregoing factors, an embodiment may authenticate the user and grant the authenticated user access to requested content. Such a method may strengthen the security of a device and more capably ensure that only authorized users access private content.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying

What is claimed is:

1. A method, comprising:
   detecting, from a user and using a sensor operatively coupled to an information handling device, facial features associated with an authorized user;
   requesting, using a prompt provided by an output device operatively coupled to an information handling device, the user to mimic at least one emotion, wherein the prompt comprises an audio clip in which an individual expresses at least one emotion, wherein the individual in the audio clip does not explicitly state the at least one emotion, and wherein the requesting comprises requesting the user to provide the at least one facial expression that corresponds to the at least one emotion;
   detecting, responsive to the requesting, at least one facial expression provided by the user; and
   authenticating the user responsive to determining that: the at least one facial expression corresponds to at least one accepted facial expression associated with the at least one emotion and the at least one facial expression comprises the facial features.

2. The method of claim 1, wherein the prompt corresponds to at least one of: a static, single emotion and a dynamic emotion sequence.

3. The method of claim 1, wherein the prompt is a visual prompt comprising a series of images, each image in the series being associated with a different emotion, and wherein the requesting comprises requesting the user to provide the at least one facial expression that corresponds to the emotion for each of the images in the series.

4. The method of claim 1, wherein the prompt is randomly generated.

5. The method of claim 1, wherein the prompt is preconfigured by the user.

6. The method of claim 1, further comprising determining whether a user command corresponds to a high risk command or a low risk command and adjusting the prompt based on the determination.

7. The method of claim 1, further comprising requesting, responsive to determining that the at least one facial expression does not correspond to the at least one emotion but that the at least one facial expression shares a predetermined similarity to the at least one emotion, an adjustment to the at least one facial expression.

8. The method of claim 1, further comprising granting the authenticated user access to requested content.

9. The method of claim 1, wherein the at least one emotion is a user-defined emotion.

10. An information handling device, comprising:
    a sensor;
    an output device; a
    processor;
    a memory device that stores instructions executable by the processor to:
    detect facial features associated with an authorized user;
    request, using a prompt, a user to mimic at least one emotion, wherein the prompt comprises an audio clip in which an individual expresses at least one emotion, wherein the individual in the audio clip does not explicitly state the at least one emotion, and wherein the requesting comprises requesting the user to provide the at least one facial expression that corresponds to the at least one emotion;
    detect, responsive to the requesting, at least one facial expression provided by the user;
    and
    authenticate the user responsive to determining that: the at least one facial expression corresponds to at least one accepted facial expression associated with the at least one emotion and the at least one facial expression comprises the facial features.

11. The information handling device of claim 10, wherein the prompt corresponds to at least one of: a static, single emotion and a dynamic emotion sequence.

12. The information handling device of claim 10, wherein the prompt is a visual prompt comprising a series of images, each image in the series being associated with a different emotion, and wherein the instructions executable by the processor to request comprise instructions executable by the processor to request the user to provide the at least one facial expression that corresponds to the emotion for each of the images in the series.

13. The information handling device of claim 10, wherein the prompt is randomly generated.

14. The information handling device of claim 10, wherein the instructions are further executable by the processor to:
    determine whether a user command corresponds to a high risk command or a low risk command; and
    adjust the prompt based on the determination.

15. The information handling device of claim 10, wherein the instructions are further executable by the processor to request, responsive to determining that the at least one facial expression does not correspond to the at least one emotion but that the at least one facial expression shares a predetermined similarity to the at least one emotion, an adjustment to the at least one facial expression.

16. The information handling device of claim 10, wherein the at least one emotion is a user-defined emotion.

17. The information handling device of claim 10, wherein the instructions are further executable by the processor to grant the authenticated user access to requested content.

18. A product, comprising:
    a storage device that stores code, the code being executable by a processor and comprising:
    code that detects facial features associated with an authorized user;
    code that request a user to mimic at least one emotion, wherein the prompt comprises an audio clip in which an individual expresses at least one emotion, wherein the individual in the audio clip does not explicitly state the at least one emotion, and wherein the requesting comprises requesting the user to provide the at least one facial expression that corresponds to the at least one emotion;
    code that detects at least one facial expression provided by the user; and
    code that authenticates the user responsive to determining that: the at least one facial expression corresponds to at least one accepted facial expression associated with the at least one emotion and the at least one facial expression comprises the facial features.

* * * * *